United States Patent [19]

Agger et al.

[11] Patent Number: 5,068,143

[45] Date of Patent: Nov. 26, 1991

[54] SHEET MATERIALS

[75] Inventors: Reginald T. Agger, Queniborough; John R. Taylor, Cosby; Alan Hardy, Wigston Fields, all of England

[73] Assignee: Bostik, Inc., Middletown, Mass.

[21] Appl. No.: 278,293

[22] Filed: Nov. 30, 1988

[30] Foreign Application Priority Data

Dec. 4, 1987 [GB] United Kingdom ............... 8728358

[51] Int. Cl.$^5$ ..................... B32B 5/16; B32B 27/40
[52] U.S. Cl. ..................... 428/241; 428/260; 428/283; 428/290; 428/319.7; 428/423.1; 528/83
[58] Field of Search ............ 428/290, 319.7, 423.1, 428/245, 241, 260, 283; 528/83

[56] References Cited

U.S. PATENT DOCUMENTS

| 2,277,941 | 3/1942 | Almy | 428/290 |
|---|---|---|---|
| 2,332,501 | 10/1943 | Austin et al. | 428/290 |
| 2,870,114 | 1/1959 | Shrimpton et al. | 528/83 X |
| 2,956,961 | 10/1960 | Kibler et al. | 428/423.1 |
| 3,014,894 | 12/1961 | Müller et al. | 528/83 X |
| 3,401,143 | 9/1968 | Finelli et al. | 528/83 X |
| 3,528,948 | 9/1970 | Reuter | 528/83 X |
| 3,975,457 | 8/1976 | Chang et al. | 260/859 |
| 4,069,602 | 1/1978 | Kremer et al. | 36/45 |
| 4,115,612 | 9/1978 | Closson, Jr. | 428/319.7 |
| 4,327,145 | 4/1982 | Mitani et al. | 428/290 |
| 4,485,228 | 11/1984 | Chang et al. | 528/84 |
| 4,689,385 | 8/1987 | MacPhee et al. | 528/83 X |

FOREIGN PATENT DOCUMENTS

| 0112950 | 7/1983 | Japan | 428/423.1 |
|---|---|---|---|
| 0674090 | 7/1979 | U.S.S.R. | 428/423.1 |

*Primary Examiner*—George F. Lesmes
*Assistant Examiner*—Terrel Morris
*Attorney, Agent, or Firm*—David G. Conlin; Peter F. Corless; Gregory D. Williams

[57] ABSTRACT

Tough, heat-formable sheet material and mouldable articles produced therefrom comprising a high-molecular weight synthetic resin as stiffening component wherein the stiffening component is a low-melting, highly-crystalline polyesterurethane formed by reacting polyester chains with isocyanate to obtain sufficient molecular weight to give desired properties.

Products are especially suitable for use in shoe counters and can be formulated to combined desired mechanical properties with predetermined set-up times during which mouldability is retained to enable several shoemaking operations to be carried out without the need for further heating.

8 Claims, No Drawings

SHEET MATERIALS

BACKGROUND OF THE INVENTION

The present invention relates to tough heat-formable sheet materials and articles made therefrom comprising a high-molecular weight synthetic resin as stiffening component. Such materials and articles are used, for example, in the shoe industry as counters; toe puffs and counters are preshaped elements, often in the form of a stiff fabric, coated with non-blocking, easy-heat or solvent-activatable adhesive. During shoe-making, these elements are softened, firstly so that they will conform to the required shape during the shoe-making operations and secondly to develop adhesive properties so that they can bond to the adjacent upper material. This bonding is achieved by a short solvent dip just prior to use, or by heat or by a combination of solvent and heat. Such materials have the disadvantages generally attributed to solvents, the pre-heating operation renders them sticky and hot and also they tend to stiffen rapidly on cooling.

To be useful as a counter material, a sheet material should be 'tough', that is, it should be resilient, flexible and non-cracking and preferably selfsupporting. Such materials are particularly suitable where resilience must be retained after adhesive bonding, as is the case in shoe making but also in applications such as garment labelling. Alternative stiffening materials/elements have been proposed where the stiffening material is the adhesive itself, covered by a light scrim to facilitate handling. Before moulding they are preheated to about 80° C., the scrim being adequate to avoid adhesive penetration under light handling, so avoiding sticky handling. When in position, slight pressure and optional further heat application produces adhesive penetration through the scrim and wetting and bonding of the upper material.

Since the adhesive itself is also the stiffening material, its composition can be selected to adjust the change from the hot, malleable state to the stiff, crystalline state, so that the elements can remain malleable for several shoe operations.

Counters of this type have been produced using a very high molecular weight caprolactone polymer having a molecular weight of 50 000 (est). However, such materials suffer in turn from the fact that in practice such high molecular weight polymers can only be applied in powder form and then sintered.

In shoe making, temperatures above 100° C. are avoided because of likely damage to materials and somewhat lower temperatures are therefore adopted for press operation and thus for softening materials for shaping purposes and for activating adhesives. Generally, temperatures in the range 60°-125° C., are adopted for these purposes, preferably 85°±5° C. Consequently, materials required for shoe counters must be relatively low-melting to suit the press requirement but this has to be associated with a high degree of stiffness/crystallinity to get the necessary toughness. This has hitherto been achieved by increasing molecular weight but this brings with it corresponding increases in viscosity.

It is accordingly an object of the present invention to provide a tough, heat-formable sheet material or articles made therefrom which can be more readily formed and processed by conventional shoe operation techniques.

SUMMARY OF THE INVENTION

According to the present invention, tough, heat-formable sheet materials and mouldable articles made therefrom comprising a high-molecular weight synthetic resin as stiffening component is characterised in that the stiffening component is provided as a highly-crystalline polyesterurethane formed by reacting polyester chains with isocyanate.

By limiting this reaction, the molecular weight of the resulting polyurethane may be controlled to a desired level.

Thus, for example, sheet materials can be prepared for use in the shoe-making industry with preferred spectra of properties such as stiffness and set up rate. Shoe counters made from the sheet material of the present invention can provide greatly increased set-up times so the moulded, warm counter can remain in the non-crystalline state long enough for several shoe operations without the need for further heating. Thus materials can be formulated to combine desired mechanical properties with predetermined set-up times.

The viscosity of the polyesterurethanes used in the present invention is low enough to enable the products of the invention to be produced by melt-coating techniques which do not require the high molecular weight polymer to be used in powder form. The polymers of the present invention can also be produced in situ by feeding metered quantities of hot catalysed polyester and hot isocyanates directly to the sheet-forming apparatus. The sheets of the present invention may be unsupported but may be produced with woven or non-woven substrates and fillers may also be incorporated in accordance with known practices. Preferably a light scrim is applied to at least one face of the sheet to facilitate handling.

By selection of the molecular weight of the polyester chains and the proportion of isocyanate used in the invention, it is possible to control both the molecular weight of the resulting polyesterurethane and also rate of set-up of the material, that is to say, the time during which the material is suitable for shoe-making operations.

Thus toe puffs, counters and the like can be produced with polyesterurethane in accordance with the invention by melt-coating, in situ reaction or using powder, although for some applications it may be preferred to avoid the use of powder because of expense. Such materials have much longer set-up times than materials hitherto used, for example, about five times longer than polycaprolactones, and can remain in the warm, non-crystalline state for say three shoe operations whereas a polycaprolactone would set-up quickly and would then need further heating for continued processing.

Suitable polyesters for use in the present invention include e.g. ethylene, butylene hexylene adipates. Commonly the isocyanate is a diisocyanate, preferably linear although isocyanates have been used with a functionality of up to about 2.4. In particular, methylene diisocyanate (MD1), toluene diisocyanate (TD1) and hydrogenated MD1 are commonly available reactants which can readily be used in the invention.

Polymers produced from hexylene and butylene adipates and having MW in the ranges 1200-10000, preferably 2000-5000 have been found particularly suitable for the present invention.

Isocyanates may be used with an index

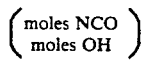

of 0.75 to 1.1, preferable 0.90 ±0.1. Below about 0.75 the final film will snap on bending. We have found optimum results with 0.97/2100 MW butylene adipate.

Fillers may be added to the material to gain a number of objectives. Apart from economies of cost, fillers may be used to increase stiffness, to increase rigidity and/or to act as spacers. In practice, fillers can be included at up to 50 wt%. Suitable fillers include the reinforcing fillers known in shoemaking such, for example, as glass fibre, pulverised fuel ash (PFA), and mineral fillers such as mica or talc. The filler is preferably incorporated in the reactive system before reaction.

Use of fillers requires an increase in polyurethane index (i.e. MW) to counter the extra stiffening effect of the filler. For example using "SNOWCAL" (RTM) 60, a calcium carbonate of weight mean diameter of 3 microns with only 0.02% >45 microns, the following minimum polyurethane index levels are necessary to avoid cracking of the sheet on bending:

| parts filler/100 parts ester | Min'm index |
| --- | --- |
| 0 | 0.78 |
| 25 | 0.90 |
| 45 | 0.93 |
| 65 | 0.96 |

These results were obtained using a base butylene adipate/MD1 polymer with

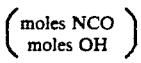

index of 0.95 with a viscosity of 20 000 poises/100° C.

DETAILED DESCRIPTION OF EMBODIMENTS OF THE INVENTION

In order that the invention be better understood, a preferred example will be described in greater detail by way of example.

EXAMPLE 1

92.21 wt % of polytertramethylene adipate, 40-45 hydroxyl Nos., 0.1-0.7 acid value, was heated to 65°-100° C. with 0.003 wt % of phosphorus acid and 7.79 wt % of liquid (>60° C.) diisocyanate ('DESMODUR'(RTM) 44 Pure) added. The reaction was maintained for three hours at 85° C.

This product was extruded at 100° C. as a 1 mm film on PTFE coated metal and when slightly cooled a loose scrim (cotton 443) pressed on. The product became white and crystallised in about 6 minutes.

Part of this material was radiantly heated on the other surface and a denser, second scrim (viscose 1201-01-21) pressed against this face.

EXAMPLE 2

Using the same materials as in EXAMPLE 1, the polyester/acid mixture at 85° C. was mixed with hot (85° C.) diisocyanate, cast as a film and heated for 5 minutes at 140° C., after which scrim was applied as in EXAMPLE 1.

The cure time for this process can be accelerated by using catalysts in known manner, e.g. 0.01 wt % of dibutyl tin dilaurate.

The materials exemplified possessed adequate properties for use as shoe-counters, having acceptable stiffness whilst able to withstand 180° bend without snapping. Adhesion to shoe upper leather was also acceptable. For example, a material prepared by Example 1 showed an RT Peel strength (N/2.54cm) of 15 after 15 seconds activation at 150° C. and of 55 after 30 seconds at 150° C. The set-up time, measured as the time to go white/rigid after 85° C. heating, was 12 minutes.

In comparison, a caprolactone polymer material—CAPA (RTM) 650—which showed adequate stiffness and could withstand 180° flexing, had a peel strength of 6 after 15 seconds activation at 150° C. and 50 after 30 seconds, and a set-up time of only 5 minutes. Moreover, such polycaprolactones are much more difficult to process, given a MW high enough to provide the required shoe-making performance, the material is very thick and viscous in a hot-melt application and very difficult to handle so that a powder/sinter method is usually adopted, despite the greatly increased expense.

We claim:

1. A heat formable sheet material comprising a woven or non-woven substrate with a polyesterurethane material as a stiffening component, which polyesterurethane material comprises:
   a) a polyester selected from the group consisting of polyethylene adipate, polyhexylene adipate and polytetramethylene adipate; and
   b) an isocyanate, the mole ratio of the isocyanate groups to the hydroxyl groups of the isocyanate and the polyester being from about 0.75 to 1.1.

2. A material according to claim 1 wherein the polyester has a molecular weight of from about 1200 to about 10,000.

3. A material according to claim 1 wherein said polyester has a molecular weight of from about 2000 to about 5000.

4. A material according to claim 1 wherein the polyesterurethane material has the ratio of 0.90 ±0.1.

5. A material according to claim 1 wherein said isocyanate comprises a diisocyanate.

6. A material according to claim 5 wherein said diisocyanate is selected from the group consisting of methylene diisocyanate and toluene diisocyanate.

7. A material according to claim 1 further comprising a filler in an amount up to 50% by weight.

8. A material according to claim 7 wherein said filler is selected from the group consisting of glass fiber, pulverized fuel ash, mica, talc, and calcium carbonate.

* * * * *